United States Patent
Seok

(10) Patent No.: US 9,844,037 B2
(45) Date of Patent: Dec. 12, 2017

(54) METHOD AND APPARATUS FOR TRANSMITTING UPLINK IN WIRELESS COMMUNICATION SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 14/766,426

(22) PCT Filed: Feb. 5, 2014

(86) PCT No.: PCT/KR2014/000995
§ 371 (c)(1),
(2) Date: Aug. 6, 2015

(87) PCT Pub. No.: WO2014/123358
PCT Pub. Date: Aug. 14, 2014

(65) Prior Publication Data
US 2015/0382342 A1    Dec. 31, 2015

Related U.S. Application Data

(60) Provisional application No. 61/761,246, filed on Feb. 6, 2013.

(51) Int. Cl.
*H04W 72/04* (2009.01)
*H04W 74/08* (2009.01)
*H04W 84/12* (2009.01)

(52) U.S. Cl.
CPC ..... *H04W 72/0413* (2013.01); *H04W 72/048* (2013.01); *H04W 72/0446* (2013.01); *H04W 74/0816* (2013.01); *H04W 84/12* (2013.01)

(58) Field of Classification Search
None
See application file for complete search history.

(56) References Cited

U.S. PATENT DOCUMENTS

2006/0114941 A1\* 6/2006 Silverman ............. H04W 74/04
                                                        370/503
2011/0122933 A1   5/2011 Adam et al.
(Continued)

FOREIGN PATENT DOCUMENTS

KR    10-2006-0117190    11/2006
KR    10-2007-0021899    2/2007
(Continued)

OTHER PUBLICATIONS

PCT International Application No. PCT/KR2014/000995, Written Opinion of the International Authority dated Apr. 30, 2014, 1 page.

*Primary Examiner* — Charles C Jiang
*Assistant Examiner* — George Atkins, Jr.
(74) *Attorney, Agent, or Firm* — Lee, Hong, Degerman, Kang & Waimey

(57) ABSTRACT

A method for transmitting an uplink includes: an STA1 transmitting to an AP each of multiple RTS frames through at least one channel from among multiple first channels; the STA1 receiving from the AP at least one CTS frame through at least one channel from among the multiple channels which have received the RTS frames; and an STA2 receiving from the AP at least one CTS frame through at least one channel from among multiple second channels, wherein the at least one CTS frame includes STA identifier information and channel information, the STA identifier information includes information for indicating the STA1 and the STA2, and wherein the channel information includes information on an uplink channel1 allocated for transmitting a data (Continued)

frame1 of the STA1 and information on an uplink channel2 allocated for transmitting a data frame2 of the STA2.

12 Claims, 16 Drawing Sheets

(56) References Cited

U.S. PATENT DOCUMENTS

| | | | | |
|---|---|---|---|---|
| 2011/0286378 A1* | 11/2011 | Kim | ........................ | H04W 4/06 370/312 |
| 2012/0020312 A1 | 1/2012 | Lv et al. | | |
| 2012/0327915 A1* | 12/2012 | Kang | .................... | H04L 5/0007 370/336 |
| 2013/0170411 A1* | 7/2013 | Vermani | ............... | H04L 1/0001 370/310 |
| 2013/0229996 A1* | 9/2013 | Wang | ................ | H04W 72/0413 370/329 |
| 2014/0247824 A1* | 9/2014 | Sohn | ................... | H04L 27/2601 370/338 |

FOREIGN PATENT DOCUMENTS

| | | | | | |
|---|---|---|---|---|---|
| KR | 10-2010-0084465 | | 7/2010 | | |
| WO | WO-2011108832 | * | 9/2011 | ............... | H04B 7/04 |

\* cited by examiner

FIG. 1
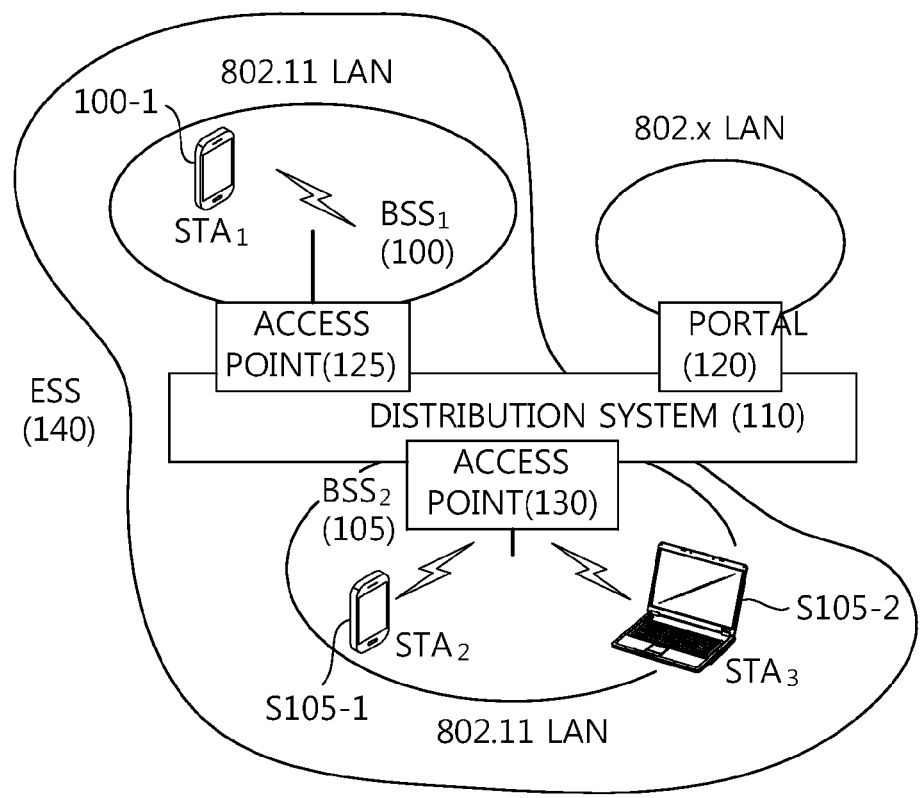
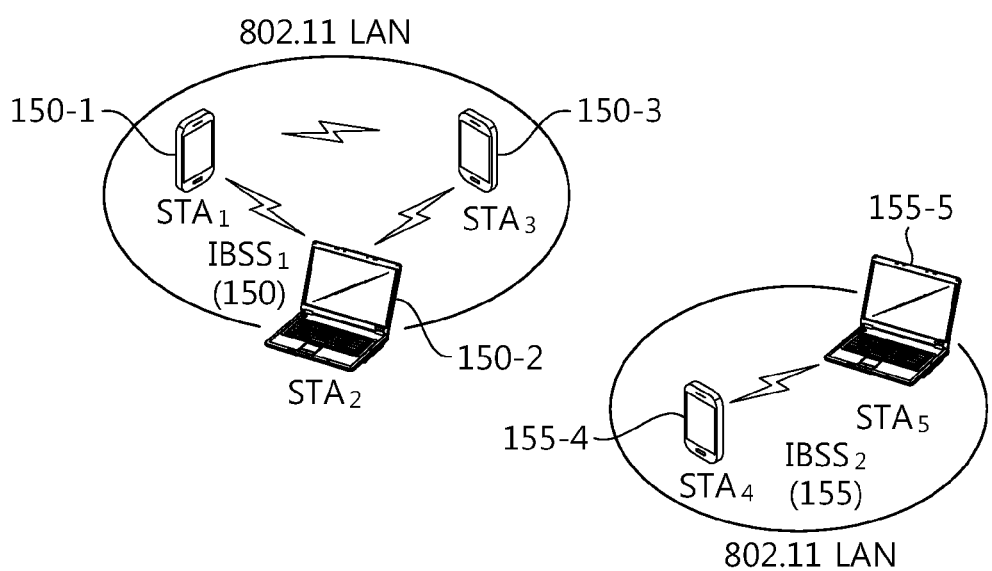

FIG. 3
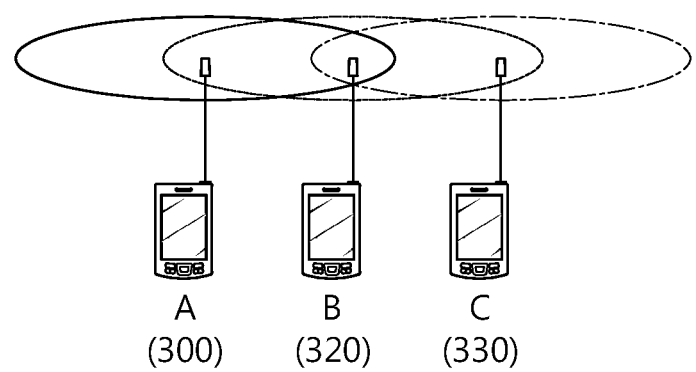
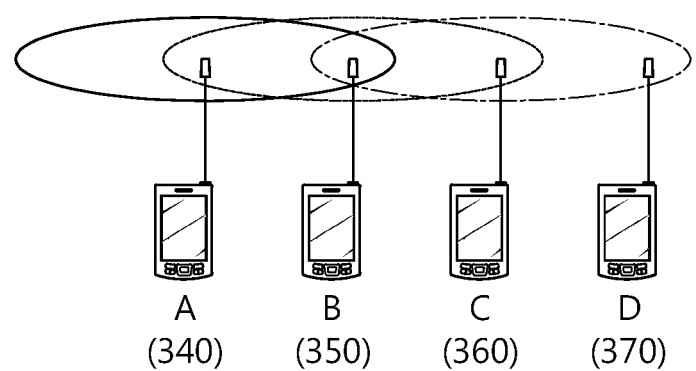

FIG. 4
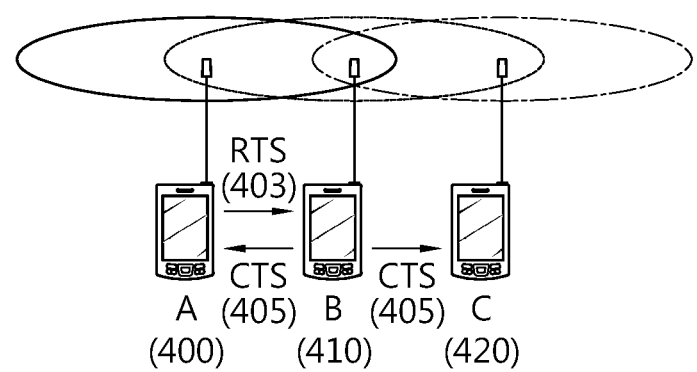
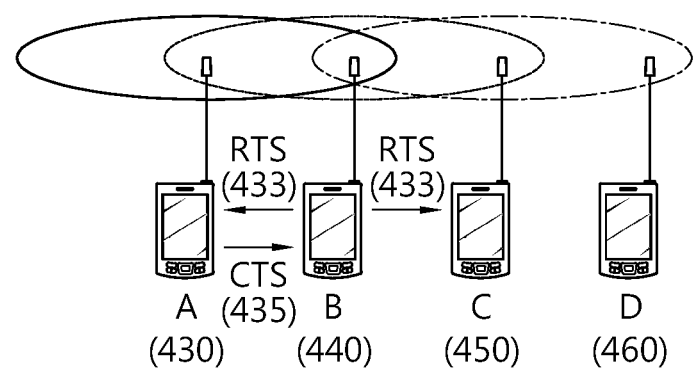

FIG. 12

FIRST DATA FRAME (1210): STF | LTF1 | SIG | Data 1 | Data 2 | Data 3 | Data 4 | ...
Indicates (SGI) — SGI | SGI | SGI | SGI

SECOND DATA FRAME (1220): STF | LTF1 | SIG | Data 1 | Data 2 | Data 3 | Data 4 | ...
Indicates (SGI) — SGI | SGI | SGI | SGI

FIRST DATA FRAME (1250): STF | LTF1 | SIG | Data 1 | Data 2 | Data 3 | Data 4 | ...
Indicates (LGI) — LGI | LGI | LGI | LGI

SECOND DATA FRAME (1260): STF | LTF1 | SIG | Data 1 | Data 2 | Data 3 | Data 4 | ...
Indicates (LGI) — LGI | LGI | LGI | LGI FIG. 15
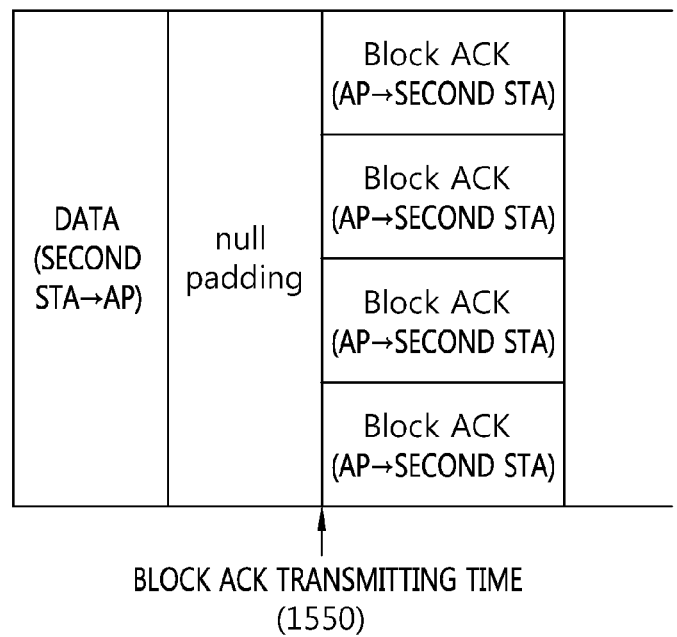
BLOCK ACK TRANSMITTING TIME
(1550)
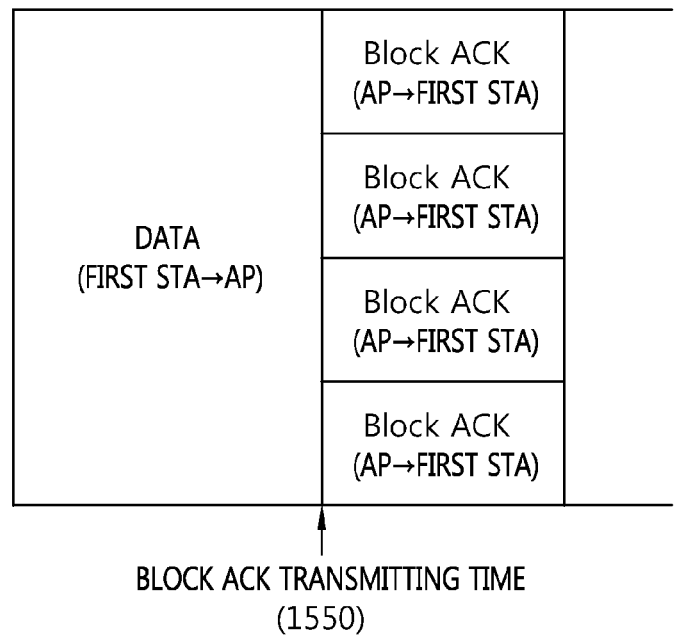
BLOCK ACK TRANSMITTING TIME
(1550)
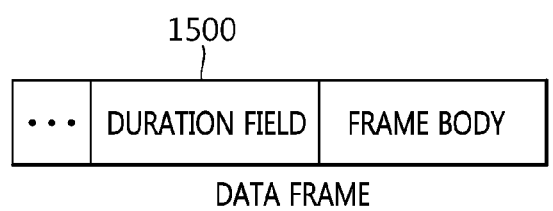
DATA FRAME

METHOD AND APPARATUS FOR TRANSMITTING UPLINK IN WIRELESS COMMUNICATION SYSTEM

CROSS-REFERENCE TO RELATED APPLICATIONS

This application is the National Stage filing under 35 U.S.C. 371 of International Application No. PCT/KR2014/000995, filed on Feb. 5, 2014, which claims the benefit of U.S. Provisional Application No. 61/761,246, filed on Feb. 6, 2013, the contents of which are all hereby incorporated by reference herein in their entirety.

BACKGROUND OF THE INVENTION

Field of the Invention

The present invention relates to wireless communication, and more particularly, to a method and an apparatus for transmitting an uplink in a wireless local area network (WLAN).

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the HEW in the future, improvement of system performance in an overlapping basic service set (OBSS) environment and improvement of outdoor environment performance, and cellular offloading are anticipated to be actively discussed rather than improvement of single link performance in one basic service set (BSS). Directionality of the HEW means that the next-generation WLAN gradually has a technical scope similar to mobile communication. When a situation is considered in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention provides a method for transmitting an uplink in a wireless communication system.

The present invention also provides an apparatus for transmitting an uplink in a wireless communication system.

In an aspect, provided is a method for transmitting an uplink in a wireless local area network (WLAN), including: transmitting, by a first station (STA), to an access point (AP) each of multiple request to second (RTS) frames through at least one channel among first multiple channels; receiving, by the first STA, at least one clear to send (CTS) frame from the AP which have received the multiple RTS frames; and receiving, by a second STA, at least one CTS frame from the AP through at least one channel among second first multiple channels, wherein at least one CTS frame includes STA identifier information and channel information, the STA identifier information includes information indicating each of the first STA and the second STA, and the channel information includes information on a first uplink channel allocated to transmit a first data frame of the first STA and information on a second uplink channel allocated to transmit a second data frame of the second STA.

In another aspect, provided is an AP for receiving uplink transmission in a wireless local area network (WLAN), including: a radio frequency (RF) unit implemented to transmit or receive a radio signal; and a processor selectively connected with the RF unit, wherein the processor is implemented to receive multiple request to second (RTS) frames transmitted through at least one channel among first multiple channels from a first STA, transmit at least one CTS frame to the first STA, wherein at least one CTS frame is transmitted through at least one channel among channels to receive the multiple RTS frames, and transmit at least one CTS frame to a second STA through at least one channel among second multiple channels, and at least one CTS frame includes STA identifier information and channel information, the STA identifier information includes information indicating each of the first STA and the second STA, and the channel information includes information on a first uplink channel allocated to transmit a first data frame of the first STA and information on a second uplink channel allocated to transmit a second data frame of the second STA.

Data transmitting and receiving methods based on FDMA can be used between an extended AP supporting the existing legacy channel band and a newly defined extended channel band and a legacy STA supporting the existing legacy channel band and an extended STA supporting the existing legacy channel band and a newly defined extended channel band. Accordingly, a data throughput and frequency efficiency can be increased by using the newly extended channel band.

BRIEF DESCRIPTION OF THE DRAWINGS

FIG. 1 is a conceptual diagram illustrating a structure of a wireless local area network (WLAN).

FIG. 3 is a conceptual diagram illustrating an issue which may occur when an STA senses a medium.

FIG. 4 is a conceptual diagram illustrating a method for transmitting and receiving an RTS frame and a CTS frame in order to solve a hidden node issue and an exposed node issue.

FIG. 12 is a conceptual diagram illustrating a method for transmitting a data frame according to the embodiment of the present invention.

FIG. 15 is a conceptual diagram illustrating a method for configuring a frame transmission time in the uplink transmitting method based on the FDMA according to the embodiment of the present invention.

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other in order to communicate and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
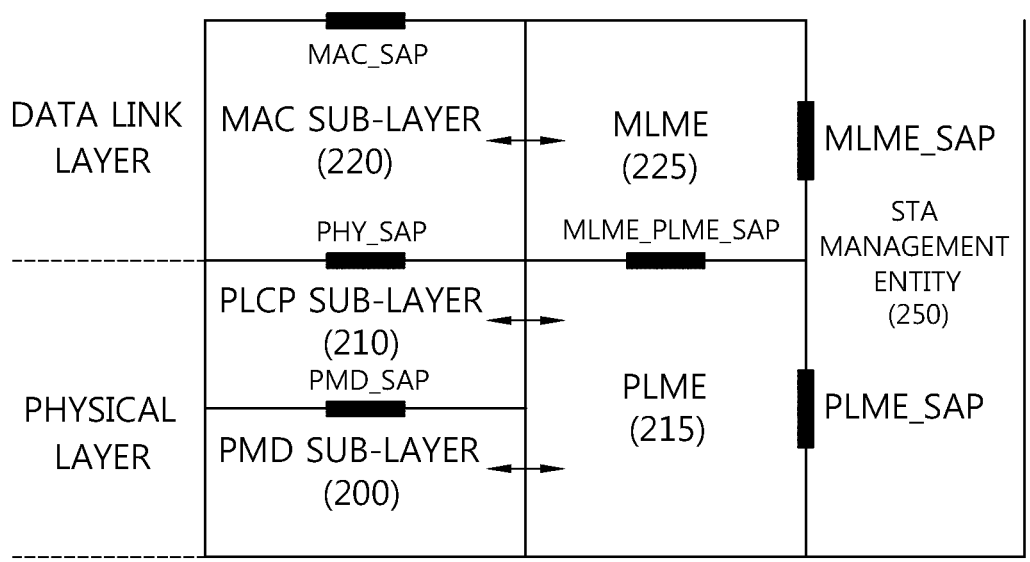
FIG. 2 is a diagram illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

FIG. 3 is a conceptual diagram illustrating an issue which may occur when the STA senses a medium.

An upper portion of FIG. 3 illustrates a hidden node issue and a lower portion of FIG. 3 illustrates an exposed node issue.

At the upper end of FIG. 3, it is assumed that an STA A 300 and an STA B 320 transmit and receive current data and an STA C 330 and an STA B 320 has data to be transmitted. When the data is transmitted and received between the STA A 300 and the STA B 320, a specific channel may be busy. However, when the STA C 330 carrier-senses a medium before transmitting the data to the STA B 320 due to transmission coverage, the STA C 330 may determine that the medium for transmitting the data to the STA B 320 is in an idle state. When the STA C 330 determines that the medium is in the idle state, the data may be transmitted from the STA C 330 to the STA B 320. Consequently, since the STA B 320 simultaneously receives information of the STA A 300 and the STA C 330, a collision of data occurs. In this case, the STA A 300 may be a hidden node as the STA C 330.

At a lower end of FIG. 3, it is assumed that an STA B 350 transmits data to an STA A 340. When an STA C 360 intends to transmit data to an STA D 370, the STA C 360 may perform carrier sensing in order to find whether the channel is busy. The STA C 360 may sense that the medium is busy due to transmission coverage of the STA B 350 because the STA B 350 transmits information to the STA A 340. In this case, although the STA C 360 intends to transmit data to the STA D 370, since it is sensed that the medium is busy, the STA C 360 may not transmit the data to the STA D 370. Until it is sensed that the medium is idle after the STA B 350 completes transmitting the data to the STA A 340, a situation in which the STA C 360 needs to unnecessarily wait occurs. That is, although the STA A 340 is out of a carrier sensing range of the STA C 360, the STA A 340 may prevent data transmission by the STA C 360. In this case, the STA C 360 becomes an exposed node of the STA B 350.

In order to solve the hidden nose issue disclosed at the upper end of FIG. 3 and the exposed node issue disclosed at the lower end of FIG. 3, it may be sensed whether the medium is busy by using an RTS frame and a CTS frame in a WLAN.

FIG. 4 is a conceptual diagram illustrating a method for transmitting and receiving the RTS frame and the CTS frame in order to solve the hidden node issue and the exposed node issue.

Referring to FIG. 4, short signaling frames such as the request to send (RTS) frame and the clear to send (CTS) frame may be used in order to solve the hidden node issue and the exposed node issue. It may be overheard whether data is transmitted and received among neighboring STAs based on the RTS frame and the CTS frame.

An upper end of FIG. 4 illustrates a method for transmitting an RTS frame 403 and a CTS frame 405 in order to solve the hidden node issue.

Assumed that both an STA A 400 and an STA C 420 intend to transmit data to an STA B 410, when the STA A 400 sends the RTS frame 403 to the STA B 410, the STA B 410 may transmit the CTS frame 405 to both the STA A 400 and the STA C 420 therearound. The STA C 420 that receives the CTS frame 405 from the STA B 410 may obtain information indicating that the STA A 400 and the STA B 410 are transmitting data. Further, the RTS frame 403 and the CTS frame 405 include a duration field including information on a busy duration of a radio channel to configure a network allocation vector (NAV) during a predetermined duration so as to prevent the STA C 420 from using the channel.

The STA C 420 waits until the transmission and reception of the data between the STA A 400 and the STA B 410 is completed, and as a result, the STA C 420 may avoid the collision at the time of transmitting the data to the STA B 410.

A lower end of FIG. 4 illustrates a method for transmitting an RTS frame 433 and a CTS frame 435 in order to solve the exposed node issue.

An STA C 450 overhears transmission of the RTS frame 433 and the CTS frame 435 of an STA A 430 and an STA B 440, and as a result, the STA C 450 may find that no collision occurs in spite of transmitting the data to another STA D 460. That is, the STA B 440 transmits the RTS frame 433 to all neighboring terminals and receives the CTS frame 435 from only the STA A 430 to which the STA B 440 needs to actually transmit data. Since the STA C 450 receives only the RTS frame 433 and may not receive the CTS frame 435 of the STA A 430, the STA A 430 may be out of a carrier sensing range of the STA C 450. Accordingly, the STA C 450 may not transmit data to the STA D 460.

An RTS frame format and a CTS frame format are disclosed in 8.3.1.2 RTS frame format and 8.3.1.3 CTS frame format of "IEEE Standard for Information Technology Telecommunications and information exchange between systems Local and metropolitan area networks Specific requirements Part 11: Wireless LAN Medium Access Control (MAC) and Physical Layer (PHY) Specifications which is IEEE Draft P802.11-REVmb"/D12 opened in November 2011.

The IEEE 802.11 WLAN (wireless local area network, WLAN) standard may have different transmission rate in various bands. A very high throughput (VHT) system which is the IEEE 802.11ac standard is to provide a throughput of 1 Gbps or more at a MAC service access point (SAP).

To this end, the VHT system may support a channel bandwidth of 80/160 MHz and 8 spatial streams. When the channel bandwidth of 160 MHz, 8 spatial streams, 256QAM, and a short guard interval (GI) are all implemented, the VHT system may provide a maximum of 6.9 Gbps transmission rate.

However, VHT STAs that support multiple VHT systems need to simultaneously use the channel in order for an aggregated throughput of a VHT BSS to satisfy 1 Gbps in an actual environment.

An AP that supports a VHT may use space division multiple access (SDMA) or multi user-multiple input multiple output (MU-MIMO) as a method for transmitting data in order for the STAs supporting the multiple VHT systems to simultaneously use the channel. That is, the VHT systems may simultaneously transmit and receive different data among the multiple VHT STAs and the VHT AP based on multiple spatial streams.

In the VHT system, legacy stations (STAs) supporting IEEE 802.11a/n are widely used in transmitting data by using the channel bandwidth of 160 MHz.

Accordingly, non-contiguous channels need to be aggregated and used.

Figure 5:
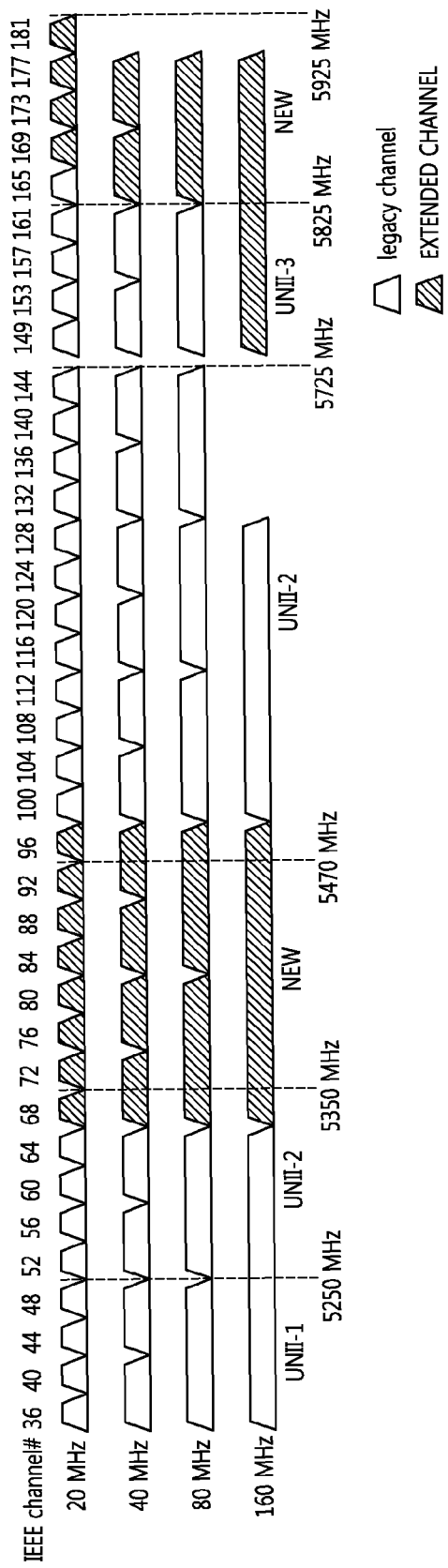
FIG. 5 is a conceptual diagram illustrating information on a bandwidth of the WLAN.

FIG. 5 is a conceptual diagram illustrating information on the bandwidth of the WLAN.

With the increase in demand for high-definition multimedia transmission, a channel bandwidth for the WLAN has been extended.

Referring to FIG. 5, channel bands which the IEEE 802.11ac may currently use and bands to be newly added in a frequency band of 5 GHz are illustrated.

When channel bands to be newly allocated for the WLAN in channel bands of 5350 MHz to 5470 MHz and 5825 MHz to 5925 MHz are considered, the number of channel bands which may be used by the STA or AP may increase. For example, referring to the 80 MHz channel band, 80 MHz channel bands which are usable may increase from 6 channels at present to 9 channels by allocating the new channel bands. As another example, referring to the 160 MHz channel band, 160 MHz channel bands which are usable may increase from 2 channels at present to 4 channels.

The legacy STA (e.g., the STA supporting the IEEE 802.11a/n/ac) in the related art, which operates at 5 GHz does not support the newly allocated channels. Accordingly, the AP that supports the newly allocated channels configures a primary channel as a channel in which the legacy STA may operate to support the legacy STA.

Hereinafter, in the embodiment of the present invention, the channel bands allocated to 5 GHz are defined and disclosed as two types of channel bands. The existing channel supported by the legacy STA such as the IEEE 802.11a/n/ac is defined as a term called a legacy channel band, and the newly allocated channel band at 5 GHz is defined as an extended channel band. Further, an STA that may operate in the extended channel band is used as a term such as an extended STA.

Hereinafter, in the embodiment of the present invention, disclosed is a method in which the legacy STA and the extended STA perform uplink transmission based on FDMA to the AP by using the legacy channel and the extended channel positioned in the 5 GHz frequency band. The legacy channel and the extended channel may be the non-contiguous channel or the contiguous channel.

The embodiment of the present invention may be applied to the FDMA based uplink transmission by the multiple STAs when all channels are the legacy channels and the FDMA based uplink transmission by the multiple STAs when all channels are the extended channels in addition to the FDMA based uplink transmission through the legacy channel and the extended channel.

Figure 6:
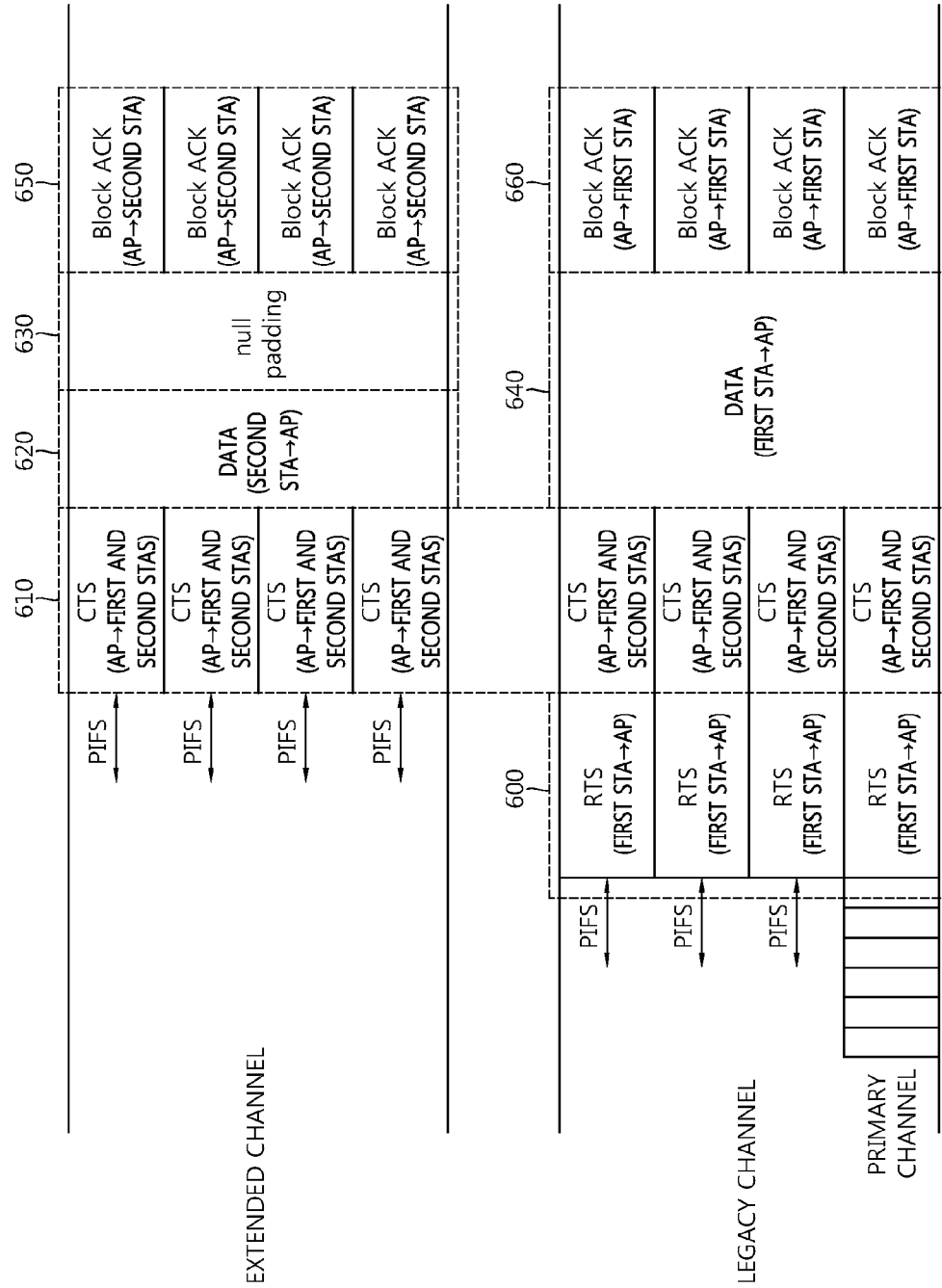
FIG. 6 is a conceptual diagram illustrating a method for transmitting uplink data by the STA according to the embodiment of the present invention.

FIG. 6 is a conceptual diagram illustrating a method for transmitting uplink data by the STA according to the embodiment of the present invention.

In FIG. 6, disclosed is in which the STA transmits the uplink data to the AP through respective 80 MHz channel bands by using a 80 MHz legacy channel band (hereinafter, referred to as a 80 MHz legacy channel) and a 80 MHz extended channel band (hereinafter, referred to as a 80 MHz extended channel). The 80 MHz legacy channel may include four 20 MHz legacy channel bands (hereinafter, referred to as a 20 MHz legacy channel). The 80 MHz extended channel may include four 20 MHz extended channel bands (hereinafter, referred to as a 20 MHz extended channel). Hereinafter, in the embodiment of the present invention, the respective channels are disclosed as the divided channel bands for easy description, but may be regarded as multiple channel bands without dividing the channel bands. The multiple channels may include eight 20 MHz channels.

A first STA may configure one 20 MHz legacy channel among four 20 MHz legacy channels included in the 80 MHz legacy channel as the primary channel. The first STA may perform a back-off procedure for channel access with respect to the configured primary channel. The first STA may be an STA that performs channel access to the AP for the uplink transmission. For example, the first STA may perform the uplink transmission to the AP by acquiring a transmission opportunity (TXOP).

The first STA may verify a channel state of another secondary channel during a PIFS interval before a back-off timer expires. When the first STA is the legacy STA, the secondary channel may include residual 20 MHz legacy channels other than the primary channel included in the 80 MHz legacy channel.

The first STA may determine the state of the channel for the point coordination function (PCF) interframe space (PIFS) time before starting the TXOP in order to determine whether the secondary channel is idle or busy.

When the secondary channel is idle for the PIFS time, the first STA may determine that the state of the secondary channel is idle. In FIG. 6, it is assumed that the first STA as the legacy STA determines the channel state of the 80 MHz legacy channel for easy description. Further, it is described that it is assumed that all secondary channels discovered by the first STA are idle. However, a channel that is determined to be busy may be present among the secondary channels and in this case, the RTS frame may not be transmitted through the corresponding channel. Further, when the first STA is the extended STA, the first STA may determine the channel state of even the secondary channel included in the extended channel.

The STA may transmit an RTS frame 600 in a duplicated PHY protocol data unit (PPDU) format through the primary channel which the AP accesses and the respective secondary channels of which channel states are determined to be idle. The RTS frame 600 in the duplicated PHY protocol data unit (PPDU) format may be a form acquired by duplicating an RTS frame format transmitted in the 20 MHz channel. The AP may transmit the RTS frame 600 at a similarly set time.

In FIG. 6, since all of 3 secondary channels (20 MHz legacy channels) are in the idle state, the AP may transmit the RTS frame 600 in the duplicated PHY protocol data unit (PPDU) format in 4 20 MHz channels including the primary channel and the secondary channels.

The AP may receive the RTS frame 600 from the first STA and determine whether the STA may perform the uplink transmission based on the FDMA. That the AP determines whether the STA performs the uplink transmission based on the FDM is referred to as a channel availability check. The AP determines information on a state of a channel for a predetermined time (e.g., PIFS) before receiving the RTS frame 600 transmitted by the first STA to perform the channel availability check. When it is determined that the state of the channel receiving the RTS frame 600 is idle for the predetermined time, the AP may determine the corresponding channel as an available channel. Whether the network allocation vector (NAV) is configured in the AP may also be used to determine whether the channel state is idle or busy.

The AP may determine the channel state for the PIFS time with respect to a channel that does not receive the RTS frame 600. For example, the AP that receives the RTS frame 600 from the first STA through the legacy channel may perform the channel availability check even with respect to the extended channel. The AP may determine the channel state for the predetermined time (e.g., PIFS) before transmitting the CTS frame 610. The AP may transmit the CTS frame 610 through the extended channel when the channel is idle for the PIFS before transmitting the CTS frame 610 through the extended channel. The RTS frame 600 is not transmitted through the extended channel, but when an STA to which the uplink data is to be transmitted through the extended channel is present, the AP transmits the CTS frame 610 through the extended channel to allocate an uplink channel to a specific STA.

The AP may transmit the CTS frame 610 at a set time in the legacy channel and/or extended channel. The STA may configure a time when the AP transmits the CTS frame 610 based on the duration field information included in the RTS frame 600. The AP may transmit the CTS frame 610 based on the transmission time information included in the duration field of the RTS frame 600.

The AP may determine information on an STA that will perform the uplink transmission based on the FDMA and information on a channel which each STA will use and transmit the CTS frame 610 including the corresponding information. The CTS frame 610 is one example of a frame used to transmit the information on the STA that will perform the uplink transmission and the information on the channel which each STA will use. Another frame may be used to transmit the information on the STA that will perform the uplink transmission and the information on the channel which each STA will use.

Figure 7:
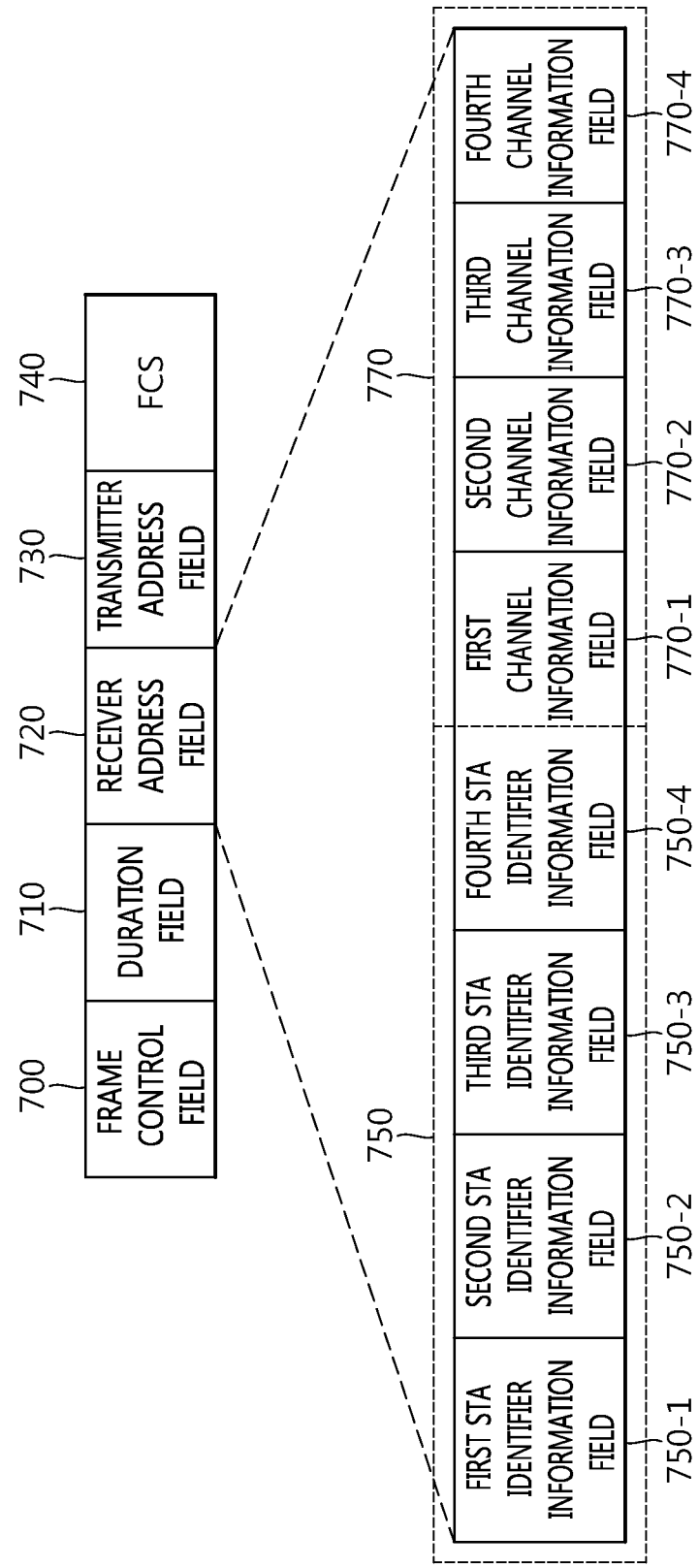
FIG. 7 is a conceptual diagram illustrating the CTS frame according to the embodiment of the present invention.

FIG. 7 is a conceptual diagram illustrating the CTS frame according to the embodiment of the present invention.

Referring to FIG. 7, the CTS frame (hereinafter, referred to as 'RTS frame) for the downlink transmitting method based on the FDMA may include a frame control field 700, a duration field 710, a receiver address field 720, a transmitter address field 730, and a frame check sequence (FCS) field 740.

The frame control field 700 may include information for indicating a transmitted frame type. For example, the frame control field 700 may include information for indicating that the transmitted CTS frame is a frame used to start the downlink transmission based on the FDMA.

The duration field 710 may include information for updating the network allocation vector (NAV) of the STA that receives the RTS frame. Alternatively, the duration field 710 may be used for the STA performing the uplink transmission to set a time to transmit a data frame through an uplink. For example, the STA may set a completion time of the uplink transmission based on the transmission time information of the duration field 710. Times when multiple STAs transmit data frames through the uplink may be set to be the same as each other by the transmission time information of the uplink data frame.

The transmitter address field 730 may include information on an address of the AP that transmits the CTS frame. Unlike the existing CTS frame, the transmitter address field 730 is included in the CTS frame to transmit identifier information of the AP that transmits the CTS frame to the STA that performs the uplink transmission. As illustrated in FIG. 6, the STA that performs the uplink transmission in the extended channel is not an STA that initiates the TXOP for the uplink transmission by itself. Accordingly, when the corresponding STA is not the STA that initiates the TXOP for the uplink transmission, which BSS the uplink transmission is triggered from needs to be transmitted to the STA. However, when the receiver address field of the CTS frame is used as a terminal's unique value like an STA MAC address, the transmitter address field may not be included in the CTS frame.

The FCS field 740 may include information for discovering an error which occurs in the frame.

The receiver address field 720 may include information on the STA that will receive the CTS frame and perform the uplink transmission and information on a transmission channel which the STA will use during the uplink transmission. For example, the receiver address field 720 may include an STA identifier information field 750 and a channel information field 770. When multiple (e.g., 4) STAs are present, multiple STA identifier information fields 750 may be allocated. The channel information field 770 may include information on channels allocated to the STA, respectively.

For example, a first STA identifier information field 750-1 may include information on a partial AID other than 1 most significant bit (MSB) among 11 association identifier (AID) bits used as identifier information of a first STA. Similarly, a second STA identifier information field 750-2 may include information on a partial AID of a second STA, a third STA identifier information field 750-3 may include information on a partial AID of a third STA, and a fourth STA identifier information field 750-4 may include information on a partial AID of a fourth STA.

According to the embodiment of the present invention, the STA that receives the CTS frame transmitted by the AP may obtain information on a frame type of the CTS frame based on the frame type indicated through the frame control field 700 of the CTS frame. When the CTS is transmitted from the AP supporting the uplink transmission based on the FDMA, the STA may identify that the identifier information included in the receiver address field 720 of the CTS frame is the partial AID information. The STA may determine whether the STA is the STA that will perform the uplink transmission based on the FDMA from the AP based on the partial AID information included in the CTS frame.

As another embodiment, a value of the AID of the STA that supports the uplink transmitting method based on the FDMA may be configured as a value that belong to a specific range such as 1 t 1024 or 1025 to 2048. It may be assumed that the value of the AID of the STA has the value in the range of 1 to 1024 and the CTS frame received by the STA is the CTS frame for the uplink transmission based on the FDMA. In this case, the STA may find that the receiver address field of the CTS frame includes information (e.g., a list of partial AIDs) on the partial AID. The STA may determine all AID values from the partial AIDs by configuring the MSB of the partial AID included in the receiver address field as 0. The STA may determine whether the STA is designated as the STA that will perform the uplink transmission from the AP based on all determined AIDs.

A first channel information field 770-1 included in the receiver address field 720 may include information on a channel bandwidth allocated for the uplink transmission of the first STA and a second channel information field 770-2 may include information on a channel bandwidth allocated for the uplink transmission of the second STA. When it is assumed that the second STA uses a channel adjacent to the first STA, channel offset information between a first channel allocated to the first STA and a second channel allocated to the second STA may not be separately transmitted in the channel information field 770. For example, the first channel information field 770-1 may include channel band information based on the primary channel and the second channel information field 770-2 may be a channel field just adjacent to the first channel allocated based on the first channel information field. When the first channel and the second channel are not adjacent channels, information on a channel offset is additionally transmitted to the channel information field to transmit information on the position of the second channel based on the first channel.

Similarly, a third channel information field 770-3 may include information on a channel bandwidth allocated for the uplink transmission of the third STA and a fourth channel information field 770-4 may include information on a channel bandwidth allocated for the uplink transmission of the fourth STA.

Figure 8:
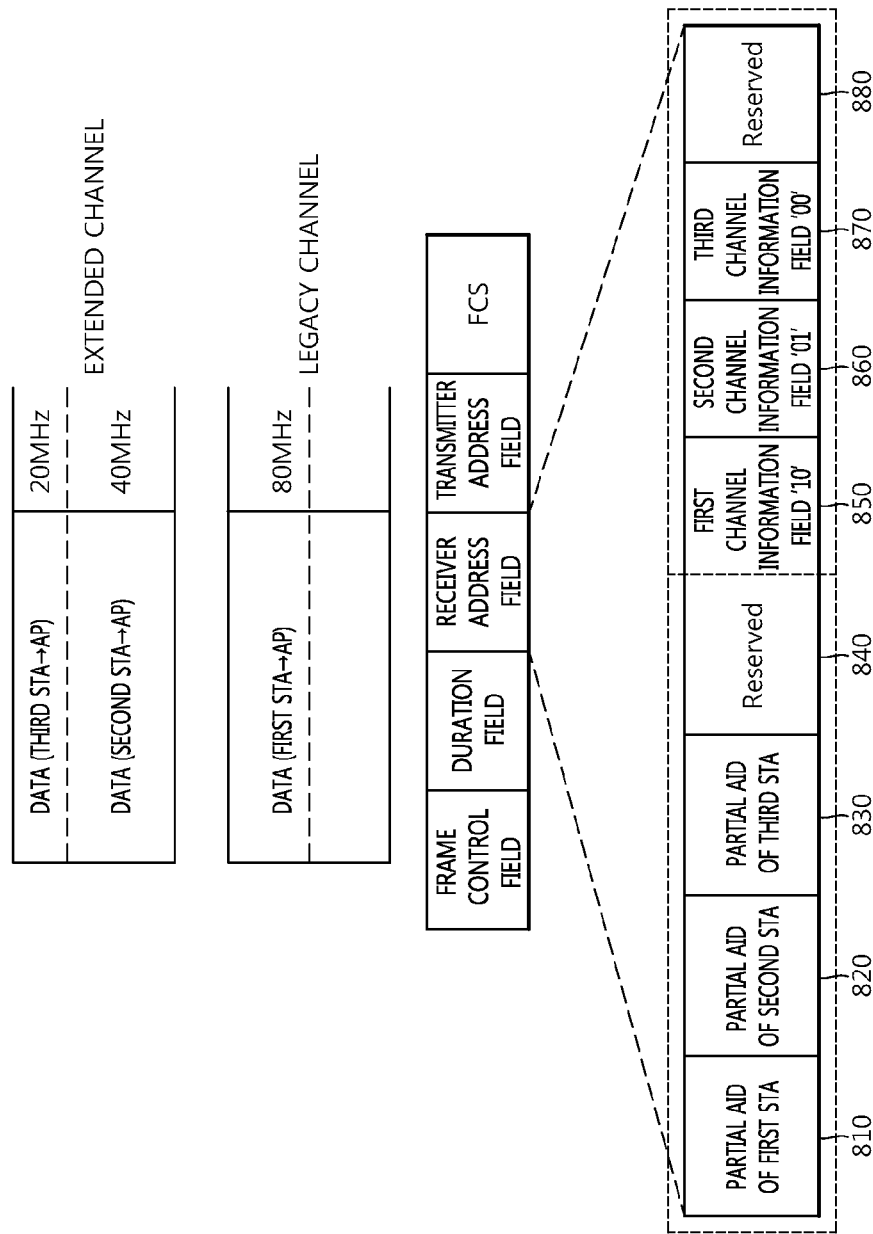
FIG. 8 is a conceptual diagram illustrating a method for transmitting an uplink based on FDMA according to the embodiment of the present invention.

FIG. 8 is a conceptual diagram illustrating the method for transmitting an uplink based on the FDMA according to the embodiment of the present invention.

In FIG. 8 it is exemplarily described that it is assumed that the AP allocates downlink transmission channels to 3 STAs based on the CTS frame.

Referring to FIG. 8, the first STA is allocated with the 80 MHz legacy channel to perform the uplink transmission to the AP. The second STA is allocated with the 40 MHz extended channel and the third STA is allocated with the second 20 MHz extended channel to perform the uplink transmission to the AP.

The receiver address field of the CTS frame transmitted by the AP may include the STA identifier information field and the channel information field.

First STA identifier information 810 may include information on a partial AID (e.g., 10 bits) of the first STA, second STA identifier information 820 may include information on a partial AID of the second STA, and third STA identifier information 830 may include information on a partial AID of the third STA. When fourth STA identifier information 840 is configured in the receiver address field as illustrated in FIG. 7, the fourth STA is not present, and as a result, the fourth STA identifier information 840 may be configured as a reserved value.

Further, a first channel information field 850 of the receiver address field may include information on an uplink channel bandwidth allocated to the first STA, a second channel information field 860 may include information on an uplink channel bandwidth allocated to the second STA, and a third channel information field 870 may include information on an uplink channel bandwidth allocated to the third STA. For example, when it is assumed that the channel information field is '10' as information of 2 bits, the channel information field indicates the 80 MHz channel bandwidth, when the channel information field is '01', the channel information field indicates the 40 MHz channel bandwidth, and when the channel information field is '00', the channel information field indicates the 20 MHz channel bandwidth, '10' may be configured in the first channel information field 850, '01' may be configured in the second channel information field 860, and '00' may be configured in the third channel information field 870. Since the fourth STA is not present, a fourth channel information field 880 may be configured as '11' which is a reserved value.

The receiver address field disclosed in FIG. 7 is one exemplary information format for transmitting the information on the STA that receives the CTS frame and the information on the uplink channel which the STA will use. The receiver address field may be implemented in various formats in order to transmit the information on the STA that receives the CTS frame and the information on the uplink channel which the STA will use. For example, when a list of the multiple STAs is configured and managed by the unit of a group, a value of an identifier for a specific STA group may be configured as the receiver address field of the CTS frame. For example, when the first STA, the second STA, the third STA, and the fourth STA are configured as one group, identifier information (e.g., group ID 10) of one configured group is used while being included in the receiver address field of the CTS frame to indicate multiple STAs.

Referring back to FIG. 6, the STA that receives the CTS frame 610 may determine whether the STA corresponds to an STA that transmits the uplink data from the AP based on the STA identifier information included in the CTS frame 610. Further, when the STA that receives the CTS frame 610 is the STA that receives the uplink transmission data, the STA may move to an uplink transmission channel indicated based on the channel information field included in the CTS frame 610. When a current channel of the STA is the uplink transmission channel indicated based on the channel information field, the STA may transmit the uplink to the AP in the current channel.

The STA may transmit DTS frames 620, 630, and 640 to the AP in the uplink transmission channel indicated based on the channel information field as a response to the received CTS frame 610.

The AP may transmit to the STAs information on an uplink data frame transmission time of each STA in order to adjust transmission times of uplink data frames transmitted by the multiple STAs. For example, the AP may transmit the duration field of the CTS frame including the information on the uplink data frame transmission time.

As illustrated in FIG. 6, it may be assumed that the first STA transmits the first data frame to the AP through the legacy channel and the second STA transmits the second data frame to the AP through the extended channel. The duration fields which the first and second STAs receive from the AP before transmitting the data frames may have the same value. The duration field of the CTS frame may include information on a maximum transmission time (alternatively, a maximum transmission duration) of the uplink data frame.

As another example, times when different STAs start transmitting the data frames 620, 630, and 640 and times when the different STAs complete transmitting the data frames are configured based on the duration field of the CTS frame, and as a result, the different STAs may transmit the data frames at the configured times. For example, the STA may configure the transmission times of the data frames 620, 630, and 640 based on the based on the duration field information included in the CTS frame 610. Even besides, the transmission start times and the transmission completion times of the data frames transmitted by the different STAs may be determined by various methods. For example, the AP may determine information on the transmission start times of the data frames transmitted by the different STAs based on the CTS frame transmitted by the STA.

The channel bandwidth of the channel in which the STA transmits the data frames 620, 630, and 640 may be determined based on the channel information field included in the CTS frame 610. That is, the channel bandwidth in which the STA transmits the data frames 620, 630, and 640 may be a channel bandwidth allocated to the STA through the CTS frame 610. The channel bandwidth allocated for the STA to transmit the data frames 620, 630, and 640 may not be larger than the channel bandwidth allocated to the STA through the CTS frame 610.

When the first and second STAs transmit the data frames 620, 630, and 640 to the AP, the sizes of the data frames which the respective STAs transmit to the AP may be different from each other and modulation coding schemes (MCS) used to transmit data may be different from each other. Accordingly, an issue in which the transmission times required for the respective STAs to transmit the data frames 620, 630, and 640 are different from each other may occur. In the embodiment of the present invention, the transmission times when the multiple STAs transmit the data frames 620, 630, and 640 may be implemented to be the same as each other.

When the first and second STAs transmit the data frames 620, 630, and 640 to the AP, the transmission completion times of the data frames 620, 630, and 640 may be configured to be the same. For example, when the second STA first completes transmission of the effective data frame 620 to the AP, the second STA may transmit the data frame 630 which is null padded to the AP until transmission of the data frame 640 to the AP ends. By using such a method, a time when the first STA completes the transmission of the data frame 640 to the AP and a time when the second STA completes the transmission of the data frames 620 and 630 to the AP may be configured to be the same.

The AP may transmit block ACKs 650 and 660 as responses to the data frames 620, 630, and 640 transmitted from the first and second STAs. The block ACKs 650 and 660 may be transmitted in the respective channels allocated to the first and second STAs for the uplink transmission. For example, the AP may transmit the block ACK 660 to the first STA through 4 respective 20 MHz legacy channels included in the 80 MHz legacy channel. Further, the AP may transmit the block ACK 650 to the second STA through 4 respective 20 MHz extended channels included in the 80 MHz extended channel.

The AP may determine transmission times of the block ACKs 650 and 660 based on the fields (e.g., duration fields) included in the data frames 620, 630, and 640 transmitted by the first and second STAs.

In the embodiment of the present invention, the respective channels are disclosed as the divided channel bands for easy description, but may be regarded as multiple channel bands without dividing the channel bands.

For example, the first STA may transmit multiple RTS frames to the access point (AP) through first multiple channels. The multiple respective RTS frames may be transmitted through multiple respective channels. The first STA may receive at least one CTS frame from the AP through at least one channel among the first multiple channels. Further, since the AP may transmit the CTS frame even to the second STA. The second STA may receive at least one CTS frame from the AP through at least one channel among the first multiple channels and second multiple channels.

Figure 9:
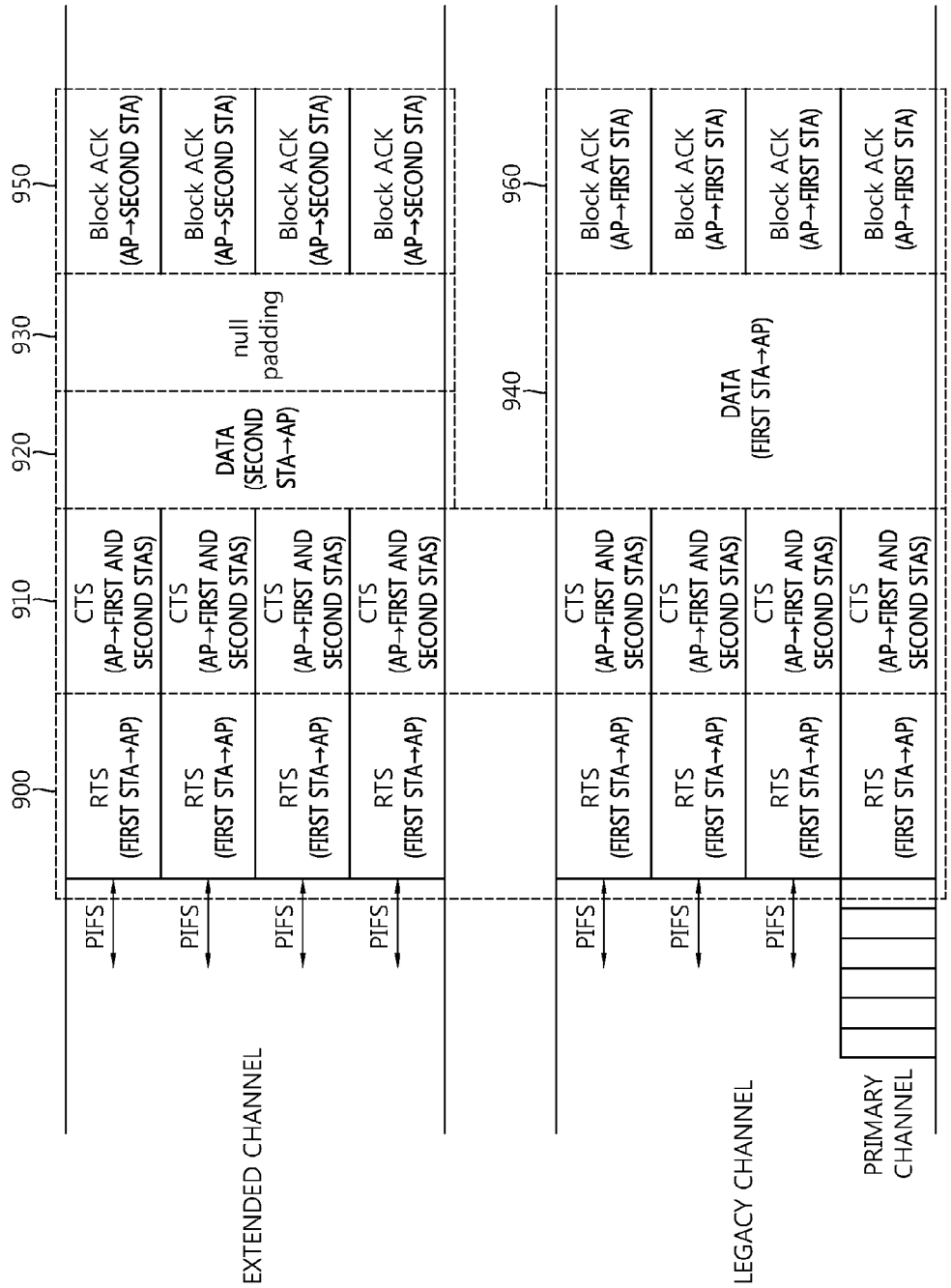
FIG. 9 is a conceptual diagram illustrating the method for transmitting a downlink based on the FDMA according to the embodiment of the present invention.

FIG. 9 is a conceptual diagram illustrating the method for transmitting an uplink based on the FDMA according to the embodiment of the present invention.

Unlike FIG. 6, in FIG. 9, disclosed is a case in which the first STA that operates in the primary channel may transmit an RTS frame 900 by using both the legacy channel and the extended channel. It is assumed and described that the first and second STAs may operate in all channels (e.g., the legacy channel and the extended channel) to support uplink FDMA.

The first STA that operates in the primary channel may transmit the RTS frame 900 even in all uplink channels which are available except for the channel in which the uplink transmission is to be performed. For example, even when the first SA intends to perform the uplink transmission through the legacy channel, another STA may transmit the RTS frame 900 up to the extended channel used to for the uplink transmission. The first STA may transmit the transmitted RTS frame in the duplicated frame format to all available uplink channels.

The AP that receives the RTS frame 900 transmitted from the first STA may determine the channel in which the uplink transmission of the first STA and another STA (e.g., second STA) is available based on the PIFS before transmitting a CTS frame 910. When all channels to receive the RTS frame 900 are available as illustrated in FIG. 9, the CTS frame 910 may be transmitted to the first and second STAs. In FIG. 9 it is assumed that the AP transmits the CTS frame 910 to the first and second STAs, but the AP may transmit the CTS frame 910 to only the first STA.

When the first and second STAs receive the CTS frame 910 from the AP through the legacy channel and the extended channel, uplink data frames 920, 930, and 940 may be transmitted through the allocated channels, respectively. Transmission times of the data frames 920, 930, and 940 transmitted by each STA may have the same value based on a duration field of the received CTS frame 910.

A data frame in which transmission of effective data is first completed may include null padding. The AP that receives the data frame may transmit block ACKs 950 and 960 to the first and second STAs.

Hereinafter, in the embodiment of the present invention, a method for performing the uplink transmission based on the FDMA by using another CTS forma will be disclosed.

Figure 10:
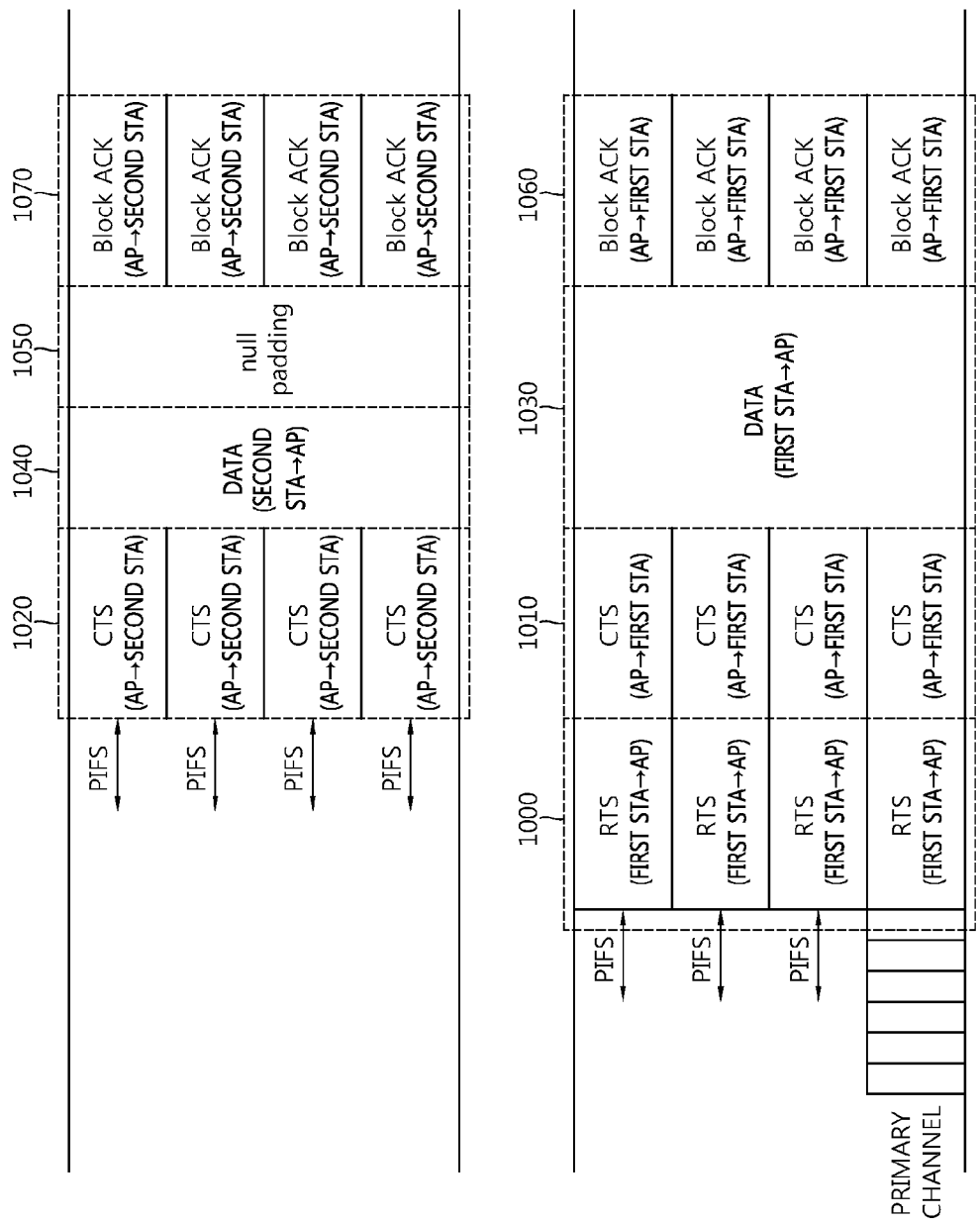
FIG. 10 is a conceptual diagram illustrating the method for transmitting an uplink based on the FDMA according to the embodiment of the present invention.

FIG. 10 is a conceptual diagram illustrating the method for transmitting an uplink based on the FDMA according to the embodiment of the present invention.

In FIG. 10, disclosed is an operation which is performed when the AP finds information on a channel in which a specific STA operates. The AP may obtain the information on the operating channel of the specific STA by various methods. For example, when the specific STA may transmit information on an operating channel of a current channel by transmitting a separate frame to the AP or based on networking information between the specific STA and the AP, which is performed previously, the AP may obtain the information on the operating channel of the specific STA.

Hereinafter, in the embodiment of the present invention, it is assumed and described that the AP finds information indicating that the second STA operates in the extended channel.

Referring to FIG. 10, the first STA may perform a back-off procedure for channel access with respect to the configured primary channel. The first STA may verify the channel state of the secondary channel during a predetermined time interval (e.g., PIFS) before starting the TXOP as the back-off timer expires. The first STA may determine the state of the channel for the PIFS time in order to determine whether the secondary channel is idle or busy.

When the secondary channel is idle for the PIFS time, the first STA may determine that the state of the secondary channel is idle. In FIG. 10, it is assumed that the first STA as the legacy STA determines the channel state of only the 80 MHz legacy channel for easy description. Further, it is assumed and described that all secondary channels discovered by the first STA are idle. However, a channel determined to be busy among the secondary channel may be present.

The first STA may transmit an RTS frame 1000 through the primary channel which the AP accesses and the respective primary channel and the secondary channels of which channel states are determined as the idle state.

The AP that receives the RTS frame 1000 from the first STA may transmit CTS frames 1010 and 1020 as a response to the RTS frame 1000 by using the aforementioned channel availability check.

The AP may receive the RTS frame 1000 from the first STA and determine whether the STA may perform the uplink transmission based on the FDMA. The AP determines information on a state of a channel for a predetermined time (e.g., PIFS) before receiving the RTS frame 1000 transmitted by the first STA to perform the channel availability check.

Further, the AP may determine the channel state for the PIFS time based on a transmission time of the CTS frame 1020 with respect to a channel that does not receive the RTS frame 1000.

Hereinafter, in the embodiment of the present invention, it is assumed and described that both the 80 MHz legacy channel and the 80 MHz extended channel are available.

The AP may transmit a first CTS frame 1010 to the first STA through the 80 MHz legacy channel and a second CTS frame 1020 through the second STA through the 80 MHz extended channel. The first CTS frame 1010 and the second CTS frame 1020 may have the duplicated PHY protocol data unit (PPDU) format.

When the AP finds the STA that operates in each channel, the first CTS frame 1010 and the second CTS frame 1020 may not include an STA identifier information field and a channel information field. That is, the first CTS frame 1010 may include only the information on the first STA without including the STA identifier information field and the channel information field in the receiver address field unlike the CTS frame described above in FIG. 7. Further, the first CTS frame 1010 may not include the transmitter address field.

Similarly, the second CTS frame 1020 may also include only the information on the second STA without including the STA identifier information field and the channel information field in the receiver address field unlike the CTS frame described above in FIG. 7. However, the second CTS frame 1020 may include the transmitter address field. Since the second STA does not transmit the RTS frame, the transmitter address field is included in the second CTS frame 1020 to notify information on the AP that transmits the RTS frame 1000.

The AP may transmit the first CTS frame 1010 and the second CTS frame 1020 at configured times. For example, the times when the AP transmits the first CTS frame 1010 and the second CTS frame 1020 may be determined by the RTS frame 1000. The AP may transmit the first CTS frame 1010 and the second CTS frame 1020 at times configured based on the duration field included in the RTS frame 1000.

Similarly, the first and second STAs may be configured to perform the uplink transmission and the completion of the uplink transmission at the times configured based on the duration fields included in the first CTS frame 1010 and the second CTS frame 1020.

The first STA that receives the first CTS frame 1010 may perform the uplink transmission in the channel that receives the first CTS frame 1010. Similarly, the second STA that receives the second CTS frame 1020 may perform the uplink transmission in the channel that receives the second CTS frame 1020.

As described above, the AP may transmit to the STAs information on an uplink data frame transmission time of each STA in order to adjust transmission times of uplink data frames transmitted by the multiple STAs. For example, the AP may transmit the duration field of the CTS frame including the information on the uplink data frame transmission time.

When the uplink transmission time of the STA is longer than the configured uplink transmission completion time, the STA may uplink-transmit the uplink data frame which is null-padded.

When transmission of an effective uplink data frame 1040 is completed before the configured uplink transmission completion time like the second STA of FIG. 10, an uplink data frame 1050 which is null-padded may be transmitted.

Figure 11:
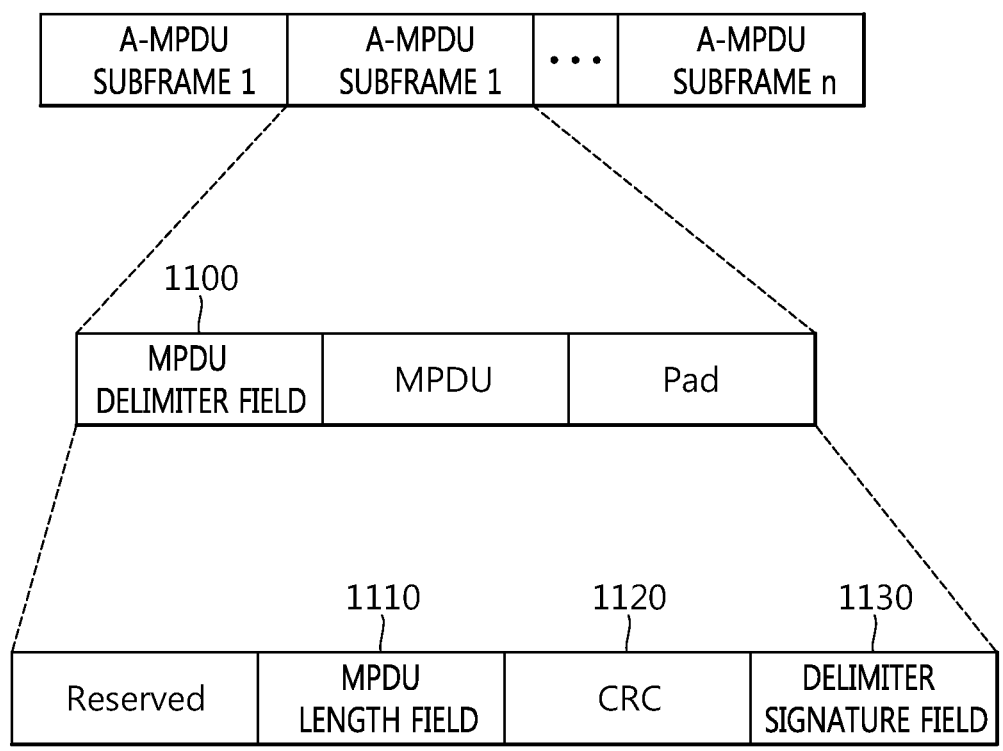
FIG. 11 is a conceptual diagram illustrating a null padding method used in transmitting the uplink by the STA according to the embodiment of the present invention.

FIG. 11 is a conceptual diagram illustrating a null padding method used in transmitting the uplink by the STA according to the embodiment of the present invention.

Referring to FIG. 11, null padding may be implemented on an MAC layer in an aggregated MAC protocol data unit (A-MPDU) format.

The STA may transmit the data frame in the A-MPDU format acquired by aggregating the MPDU. The null padding may be implemented by transmitting only a subframe header of the A-MPDU.

Each A-MPDU format may include multiple A-MPDU subframes. Each A-MPDU subframe may include an MPDU delimiter field 1100, the MPDU, and a padding bit.

The MPDU delimiter field 1100 may include an MPDU length field 1110, a cyclic redundancy check (CRC) 1120, and a delimiter signature field 1130.

The length field 1110 may include information on the length of the MPDU, the CRC 1120 may include information for error checking, and the delimiter signature field 1130 may include information for scanning an MPDU delimiter.

According to the embodiment of the present invention, the STA may encode and fill multiple A-MPDU subframes positioned at a temporally lower priority in the A-MPDU frame format with only the MPDU delimiter field 1100 for the null padding. For example, the STA repeatedly transmits the MPDU delimiter in which the MPDU length field 1110 is configured as 0 to perform the null padding.

The transmission completion times of the data frames uplink-transmitted by the multiple STAs may be the same as each other. For example, a time when the first STA completes the transmission of a first data frame to the AP and a time when the second STA completes the transmission of a second data frame to the AP may be the same as each other. Various method may be used in order to configure the transmission completion times of the data frames uplink-transmitted by the multiple STAs may be the same as each other to be the same as each other. For example, the times when the multiple STAs transmit the uplink data may be configured to be the same as each other based on the CTS frame transmitted by the AP. As another example, the times when the first and second STAs transmit the uplink data may be configured to be the same as each other based on the information to configure the uplink data transmission time included in the RTS frame transmitted by the first STA.

When a transmission time of the effective uplink data included in the first data frame is shorter than that of the effective uplink data included in the second data frame, the first data frame may be null-padded in order to configure the times when the multiple STAs transmit the uplink data to be the same as each other. The effective uplink data may be data which the STA needs to actually uplink-transmit. The effective uplink data may be uplink data which is not null-padded. For example, the effective uplink data may be transmitted while being included in the MPDU. Residual data frames other than the maximum interval transmission data frame among the multiple data frames may be null-padded.

FIG. 12 is a conceptual diagram illustrating a method for transmitting a data frame according to the embodiment of the present invention.

In the uplink transmitting method based on the FDMA according to the embodiment of the present invention, guard intervals used in the data frames transmitted by the respective STAs may be configured as the same guard interval. The reason is that since a long guard interval (LGI) adopts a guard interval of 0.8 us and a short guard interval (SGI) adopts a guard interval of 0.4 us, when a specific channel uses LGI and another channel uses the SGI, the times when the STA completes the uplink transmission may be the same as each other.

According to the embodiment of the present invention, all uplink channels use the same guard interval to configure times when the multiple STAs complete transmitting the data frames to be the same as each other. The guard intervals used in the respective data frames transmitted by the multiple STAs may be selected as one of the SGI and the LGI. That is, the guard interval of the data frame which the multiple STAs transmit to the AP at a specific time may be selected and used as one of the SGI and the LGI.

In detail, referring to an upper end of FIG. 11, when a first data frame 1210 transmitted by the first STA is configured to use the SGI, a second data frame 1220 transmitted by the second STA may also be configured to use the SGI.

On the contrary, referring to a lower end of FIG. 11, when a first data frame 1250 transmitted by the first STA is configured to use the LGI, a second data frame 1260 transmitted by the second STA may also be configured to use the LGI.

It may be assumed that the STA transmits data to the AP by using a transmission method such as multi-user (MU)- multiple input multiple output (MIMO). For example, the first and second STAs may perform the uplink transmission based on multiple spatial streams. Like the aforementioned example, it is assumed that the first STA transmits data to the AP based on 4 20 MHz legacy channels and the second STA transmits the data to the AP based on 4 20 MHz extended channels. In this case, the first STA may transmit the data to the AP through 4 spatial streams and the second STA may transmit the data to the AP through 4 spatial streams.

When a transmission method using MIMO is used, the number of long training fields (LTF) which are fields used for channel prediction, and synchronization of a frequency and the time, which are included in the data frame may vary depending on the number of spatial streams.

Figure 13:
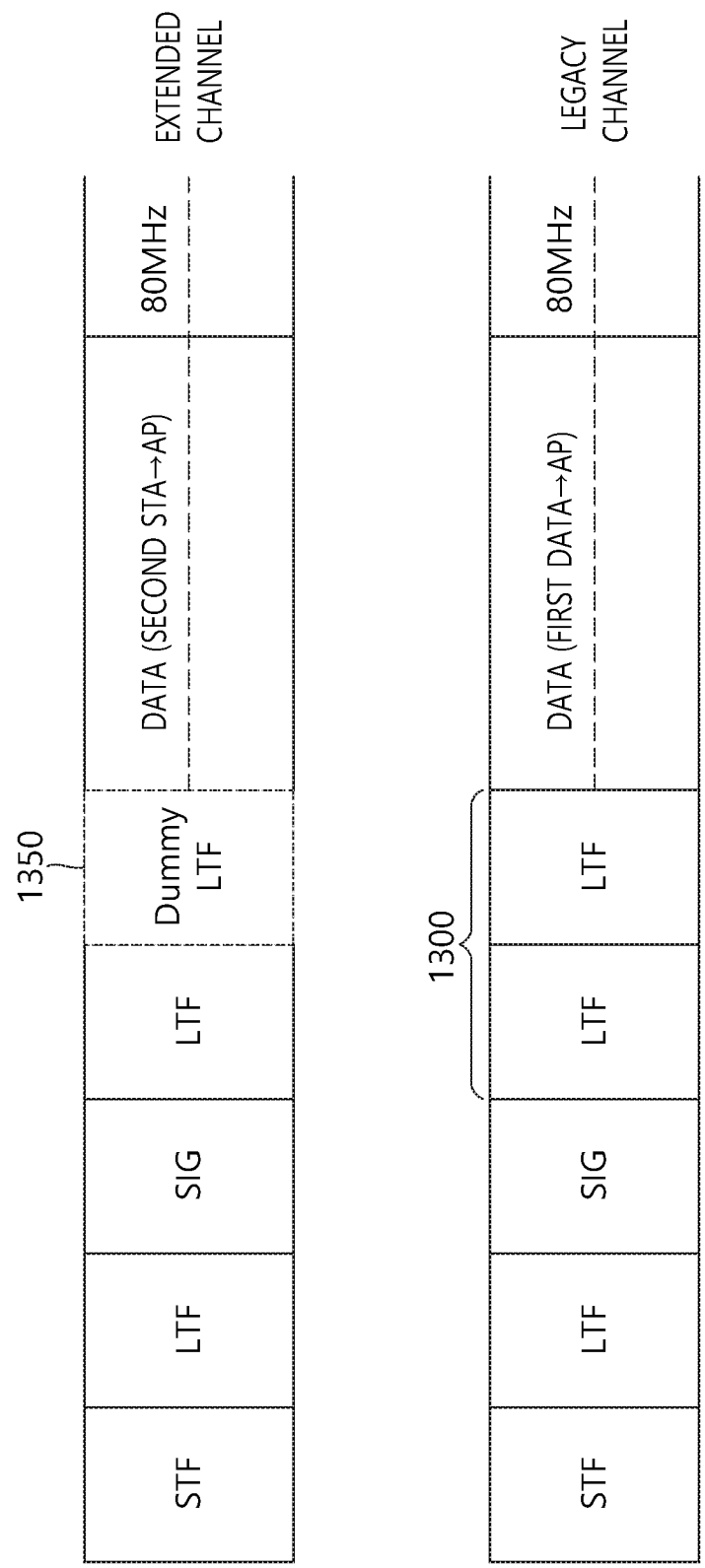
FIG. 13 is a conceptual diagram illustrating a frame structure by the transmission method according to the embodiment of the present invention.

FIG. 13 is a conceptual diagram illustrating a frame structure by the transmission method according to the embodiment of the present invention.

Referring to a lower end of FIG. 13, the data frame which the first STA transmits to the AP based on the legacy channel is illustrated. It may be assumed that the first STA uses two spatial streams at the time of transmitting data to the AP based on the legacy channel. In this case, two LTFs 1300 are included in the data frame transmitted by the AP to be generated.

It is assumed that the second STA uses one spatial stream at the time of transmitting the data frame to the AP based on the extended channel. When one spatial stream is used, one LTF may be included in the data frame. In this case, a time when the first STA completes the transmission of the uplink frame to the AP and a time when the second STA completes the transmission of the uplink data frame to the AP may be different from each other. For example, the LGI is used during transmission of the LTF and when the SGI is used during transmitting the data, the completion time of the transmission of the data frame by the first STA and the completion time of the transmission of the data frame by the second STA may be different from each other.

Therefore, in the embodiment of the present invention, when the numbers of spatial streams which the multiple STAs use to transmit the data frame are different from each other, a dummy LTF 1350 is added to the data frame which may be transmitted. For example, the dummy LTF 1350 may be included in a PLCP preamble or a PLCP header of the data frame. By using such a method, the completion times of the uplink transmission by the multiple STAs may be configured to be the same as each other.

That is, in addition to an LTF including a channel prediction sequence required for a spatial stream actually transmitted to the AP, the LTF is additionally inserted in order to adjust the numbers of LTFs to be the same as each other in respective channels.

The number of spatial streams of the second STA, which are actually transmitted is one as illustrated in FIG. 13, but the second STA further adds one additional dummy LTF 1350 to the data frame to generate the data frames so as to be the same as the number of LTFs included in the data frame transmitted by the first STA. When the number of spatial streams of the STA is not the maximum, the STA may configure the number of LTFs based on the number of spatial streams of another STA that performs the uplink transmission.

The first and second STAs may receive information on the number of spatial streams used by another STA or information on the number of LTFs to be included in the data frame in advance before the data frame is transmitted in order to adjust the total number of LTFs included in the data frame. For example, the first and second STAs may receive information on the number of spatial streams which another STA uses to transmit the data frame or the number of LTFs to be included in the data frame based on the frame (e.g., CTS frame) transmitted from the AP.

Figure 14:
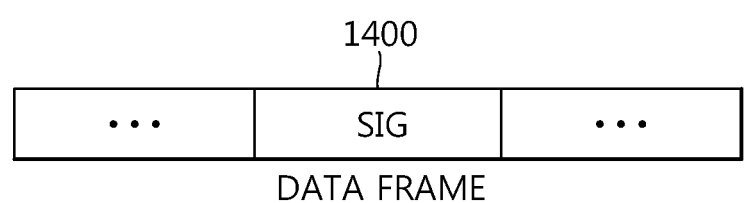
FIG. 14 is a conceptual diagram illustrating a PLCP header according to the embodiment of the present invention.

FIG. 14 is a conceptual diagram illustrating the data frame according to the embodiment of the present invention.

Referring to FIG. 14, the data frame may include information associated with a dummy LTF in an SIG field 1400.

For example, the SIG field 1400 may include the number of spatial streams used to actually transmit the data frame and the total number of LTFs in order to support the dummy LTF. When the case illustrated in FIG. 13 is assumed, the SIG field 1400 of the data frame transmitted by the second STA may include information indicating that the number of spatial streams is one and the total number of LTFs is two.

As another embodiment, the SIG field 1400 may directly include the number of dummy LTFs instead of the total number of LTFs. For example, when the case illustrated in FIG. 13 is assumed, the SIG field 1400 of the data frame transmitted by the second STA may include information indicating that the number of dummy LTFs is one.

The SIG field 1400 is one example and the SIG field 1400 according to the embodiment of the present invention may include information on the number of used spatial streams, information (e.g., information regarding presence of the dummy LTF and information to determine the number of dummy LTFs) associated with the dummy LTF.

FIG. 15 is a conceptual diagram illustrating a method for configuring a frame transmission time in the uplink transmitting method based on the FDMA according to the embodiment of the present invention.

In FIG. 15, disclosed is a method in which the AP transmits the block ACKs to the multiple STAs at configured times, but such a method may also be used for the multiple STAs and the AP to start or complete transmission of different data or signals at the configured times.

Referring to FIG. 15, the AP that receives the data frames in the respective channels transmits the block ACKs to the first and second STAs through the allocated channels to notify whether the data frames were successfully received. When the AP transmits the block ACKs by using different channels, transmission times 1550 of the block ACKs need to be configured to be the same.

Information on the transmission times 1550 of the block ACKs transmitted by the AP is included in the data frame which may be transmitted in order to configure the transmission times of the block ACKs transmitted by the AP to be the same as each other.

It may be assumed that the first STA transmits the data frame to the AP through the legacy channel and the second STA transmits the data frame to the AP through the extended channel. In this case, a field (e.g., duration field) 1500 of the first data frame transmitted by the first STA may include information on a time when the AP transmits the block ACK as a response to the data frame. Further, a field (e.g., duration field) 1500 of the second data frame transmitted by the second STA may include information on a time when the AP transmits the block ACK as a response to the data frame. For example, the duration fields 1500 included in the first data frame and the second data frame may similarly include the information on the transmission times of the block ACKs. In this case, the AP may transmit the block ACKs to the first and second STAs at ACK transmission times 1550 configured to be the same as each other based on the duration field 1500 included in the received data frames.

Further, according to the embodiment of the present invention, the AP may transmit the block ACKs to the first and second STAs through the legacy channel and the extended channel based on the grouped addresses in addition to respective separate individual address block ACKs as illustrated in FIG. 15. For example, the AP may transmit whether to receive the data received from the first and second STAs in a group address block ACK format in which the multiple STAs (e.g., the first STA and the second STA) are configured by group addresses. The group address block ACK may include information indicating whether to receive the data received from the first and second STAs in one PPDU format in a bitmap form. Herein, one PPDU may be a single MPDU, an aggregated MAC service data unit, or an aggregated MAC protocol data unit (A-MPDU).

The group address block ACK may be transmitted through the legacy channel and the extended channel. The AP may transmit the group address block ACK in a single PPDU or a duplicated PPDU format.

Figure 16:
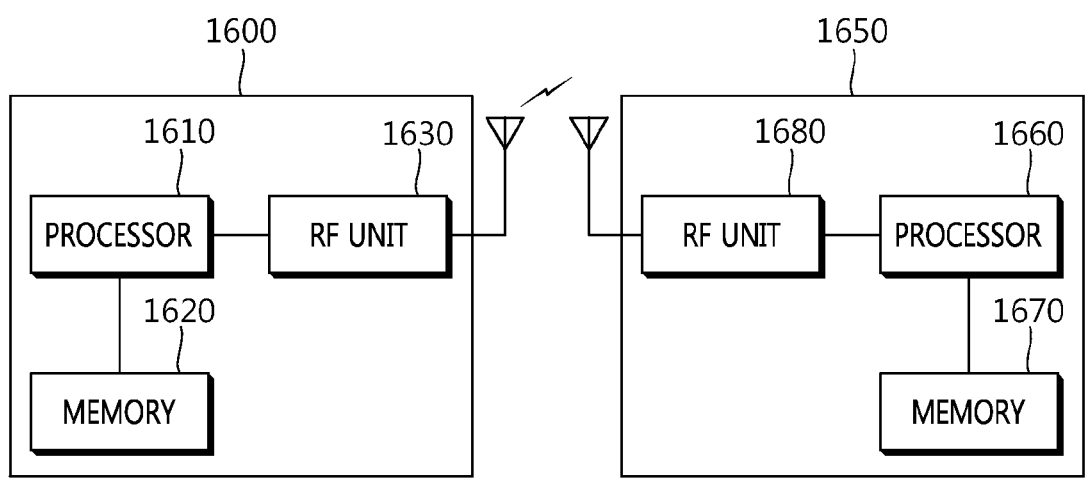
FIG. 16 is a block diagram illustrating a wireless apparatus to which the embodiment of the present invention can be applied.

FIG. 16 is a block diagram illustrating a wireless device to which an embodiment of the present invention may apply.

Referring to FIG. 16, the wireless device may be an STA that may implement the above-described embodiments, and the wireless device may be an AP 1650 or a non-AP STA (or STA)(1600).

The STA 1600 includes a processor 1610, a memory 1620, and an RF (Radio Frequency) unit 1630.

The RF unit 1630 may be connected with the processor 1620 to transmit/receive radio signals.

The processor 1620 implements functions, processes, and/or methods as proposed herein. For example, the processor 1620 may be implemented to perform the operation of the above-described wireless device according to an embodiment disclosed in FIG. 6 to FIG. 15 of the present invention.

For example, the processor 1620 may be implemented to move the channel to transmit the uplink data based on the CTS frame transmitted from the AP. Further, the processor 1620 may be implemented to generate a data frame including null padding so that transmission is completed at a specific time at time of transmitting the data frame.

The AP 1650 includes a processor 1660, a memory 1670, and an RF (Radio Frequency) unit 1680.

The RF unit 1680 may be connected with the processor 1660 to transmit/receive radio signals.

The processor 1660 implements functions, processes, and/or methods as proposed herein. For example, the processor 1660 may be implemented to perform the operation of the above-described wireless device according to an embodiment disclosed in FIG. 6 to FIG. 15 of the present invention.

For example, the processor 1660 may be implemented to receive multiple RTS frames transmitted through at least one channel among first multiple channels from a first STA and transmit at least one CTS frame to the first STA through at least one channel among the channels to receive the multiple RTS frames. Further, the processor 1660 may be implemented to transmit to a second STA at least one CTS frame which is the same as the CTS frame transmitted to the first STA through at least one channel among second multiple channels. The CTS frame may include STA identifier information and channel information, the STA identifier information may include information indicating each of the first and second STAs, and the channel information may include information on a first uplink channel allocated to transmit a first data frame of the first STA and information on a second uplink channel allocated to transmit a second data frame of the second STA.

The processor 1610, 1620 may include an ASIC (Application-Specific Integrated Circuit), other chipset, a logic circuit, a data processing device, and/or a converter that performs conversion between a baseband signal and a radio signal. The memory 1620, 1670 may include a ROM (Read-Only Memory), a RAM (Random Access Memory), a flash memory, a memory card, a storage medium, and/or other storage device. The RF unit 1630, 1680 may include one or more antennas that transmit and/or receive radio signals.

When an embodiment is implemented in software, the above-described schemes may be embodied in modules (processes, or functions, etc.) performing the above-described functions. The modules may be stored in the memory 1620, 1670 and may be executed by the processor 1610, 1660. The memory 1620, 1670 may be positioned in or outside the processor 1610, 1660 and may be connected with the processor 1610, 1660 via various well-known means.

The invention claimed is:

1. A method for uplink transmission in a wireless local area network (WLAN), the method comprising:
   receiving, by an access point (AP), at least one request to send (RTS) frame from a first station (STA) through at least one first channel of a plurality of channels;
   transmitting, by the AP, at least one first clear to send (CTS) frame to the first STA through the at least one first channel; and
   transmitting, by the AP, at least one second CTS frame to a second STA through at least one second channel of the plurality of channels even though an RTS frame is not received from the second STA,
   wherein the at least one first CTS frame includes STA identifier information and channel information,
   wherein the at least one second CTS frame includes the STA identifier information and the channel information,
   wherein the STA identifier information includes first identifier information indicating the first STA and second identifier information indicating the second STA, and
   wherein the channel information includes first channel information for a first data frame to be transmitted from the first STA and second channel information for a second data frame to be transmitted from the second STA.

2. The method of claim 1, further comprising:
   receiving, by the AP, the first data frame from the first STA through at least one first uplink channel according to the first channel information; and
   receiving, by the AP, the second data frame from the second STA through at least one second uplink channel according to the second channel information,
   wherein the at least one first CTS frame and the at least one second CTS frame are duplicated physical (PHY) protocol data unit (PPDU) format.

3. The method of claim 1, wherein:
   the plurality of channels include eight sub-channels;
   each of the eight sub-channels has a bandwidth of 20 MHz;
   the at least one first channel includes at least one of the eight sub-channels; and
   the at least one second channel includes at least one of the eight sub-channels.

4. The method of claim 3, wherein:
   the first data frame includes null padding when a transmission time of first effective uplink data included in the first data frame is shorter than a transmission time of first effective uplink data included in the second data frame; and
   the null padding includes a repeated medium access control (MAC) protocol data unit (MPDU) delimiter field in which a MPDU length field is configured as 0.

5. The method of claim 2, wherein:
   the first data frame includes at least one first long training field (LTF);
   the second data frame includes at least one second (LTF);
   a number of the at least one first LTF is the same as a number of the at least one second (LTF); and
   each of the at least one first LTF and the at least one second LTF is a field used for channel prediction.

6. The method of claim 1, wherein the STA identifier information further includes a partial association identifier (AID) value other than 1 bit corresponding to a most significant bit among AIDs of each of the first STA and the second STA.

7. An access point (AP) for receiving uplink data in a wireless local area network (WLAN), the AP comprising:
   a radio frequency (RF) unit configured to transmit and receive a radio signal;
   a processor operatively connected to the RF unit and configured to:
   receive at least one request to send (RTS) frame from a first station (STA) through at least one first channel of a plurality of channels;
   transmit at least one first clear to send (CTS) frame to the first STA through the at least one first channel; and
   transmit at least one second CTS frame to a second STA through at least one second channel of the plurality of channels even though an RTS frame is not received from the second STA,
   wherein the at least one first CTS frame includes STA identifier information and channel information,
   wherein the at least one second CTS frame includes the STA identifier information and the channel information,
   wherein the STA identifier information includes first identifier information indicating the first STA and second identifier information indicating the second STA, and
   wherein the channel information includes first channel information for a first data frame to be transmitted from the first STA and second channel information for a second data frame to be transmitted from the second STA.

8. The AP of claim 7, wherein:
   the processor is further configured to:
   receive the first data frame from the first STA through at least one first uplink channel according to the first channel information; and
   receive the second data frame from the second STA through at least one second uplink channel according to the second channel information,
   the at least one first CTS frame and the at least one second CTS frame are duplicated physical (PHY) protocol data unit (PPDU) format.

9. The AP of claim 7, wherein:
   the plurality of channels include eight sub-channels;
   each of the eight sub-channels has a bandwidth of 20 MHz;
   the at least one first channel includes at least one of the eight sub-channels; and
   the at least one second channel includes at least one of the eight sub-channels.

10. The AP of claim 9, wherein:
    the first data frame includes null padding when a transmission time of first effective uplink data included in the first data frame is shorter than a transmission time of first effective uplink data included in the second data frame; and the null padding includes a repeated medium access control (MAC) protocol data unit (MPDU) delimiter field in which a MPDU length field is configured as 0.

11. The AP of claim 8, wherein:
the first data frame includes at least one first long training field (LTF);
the second data frame includes at least one second (LTF);
a number of the at least one first LTF is the same as a number of the at least one second (LTF); and
each of the at least one first LTF and the at least one second LTF is a field used for channel prediction.

12. The AP of claim 7, wherein the STA identifier information further includes a partial association identifier (AID) value other than 1 bit corresponding to a most significant bit among AIDs of each of the first STA and the second STA.

\* \* \* \* \*